(12) United States Patent
Kurtz et al.

(10) Patent No.: US 7,258,018 B2
(45) Date of Patent: Aug. 21, 2007

(54) HIGH ACCURACY, HIGH TEMPERATURE, REDUNDANT MEDIA PROTECTED DIFFERENTIAL TRANSDUCERS

(75) Inventors: Anthony D. Kurtz, Saddle River, NJ (US); Alexander A. Ned, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 11/258,787

(22) Filed: Oct. 26, 2005

(65) Prior Publication Data

US 2007/0089526 A1 Apr. 26, 2007

(51) Int. Cl.
*G01L 7/08* (2006.01)
(52) U.S. Cl. ............................. 73/715; 73/721; 73/754
(58) Field of Classification Search ........... 73/700–756
See application file for complete search history.

(56) References Cited

U.S. PATENT DOCUMENTS

| | | | |
|---|---|---|---|
| 4,695,817 A | | 9/1987 | Kurtz et al. |
| 4,802,952 A | * | 2/1989 | Kobori et al. ................ 438/51 |
| 5,286,671 A | | 2/1994 | Kurtz et al. |
| 5,303,594 A | | 4/1994 | Kurtz et al. |
| 5,473,944 A | * | 12/1995 | Kurtz et al. .................. 73/704 |
| 5,614,678 A | | 3/1997 | Kurtz et al. |
| 5,955,771 A | | 9/1999 | Kurtz et al. |
| 5,973,590 A | | 10/1999 | Kurtz et al. |
| 6,210,989 B1 | * | 4/2001 | Kurtz et al. .................. 438/51 |
| 6,235,611 B1 | | 5/2001 | Kurtz et al. |
| 6,272,929 B1 | * | 8/2001 | Kurtz et al. .................. 73/727 |
| 6,293,154 B1 | * | 9/2001 | Kurtz ........................... 73/727 |
| 6,327,911 B1 | * | 12/2001 | Kurtz et al. .................. 73/727 |
| 6,330,829 B1 | | 12/2001 | Kurtz et al. |
| 6,424,017 B2 | | 7/2002 | Kurtz et al. |
| 6,523,415 B2 | * | 2/2003 | Kurtz et al. .................. 73/727 |
| 6,861,276 B2 | | 3/2005 | Kurtz |

* cited by examiner

*Primary Examiner*—Edward Lefkowitz
*Assistant Examiner*—Jermaine Jenkins
(74) *Attorney, Agent, or Firm*—Plevy, Howard & Darcy PC

(57) ABSTRACT

A semiconductor chip for use in fabricating pressure transducers, including: a semiconductor wafer having a top and a bottom surface, a layer of an insulating material formed on the top surface, the bottom surface having at least two recesses of substantially equal dimensions and spaced apart, the recesses providing first and second substantially equal thin active areas, which areas deflect upon application to a force applied to the top surface, a first plurality of piezoresistive devices arranged in a given pattern and positioned on the insulating material and located within the first area, a second equal plurality of piezoresistive devices arranged in the identical pattern and located on the insulating material within the second active area, first connecting means for connecting the first plurality of piezoresistive devices in a first array, second connecting means for connecting the second plurality of piezoresistive devices in a second array corresponding to the first array.

12 Claims, 5 Drawing Sheets

CHANNEL 1

HIGH ACCURACY, HIGH TEMPERATURE, REDUNDANT MEDIA PROTECTED DIFFERENTIAL TRANSDUCERS

FIELD OF THE INVENTION

The present invention relates generally to pressure transducers and more particularly to environmentally protected, differential pressure transducers.

BACKGROUND OF THE INVENTION

There is a need for differential pressure transducers in general, and especially differential pressure transducers capable of operating at high pressures and high temperatures. U.S. Pat. No. 4,695,817, entitled "Environmentally Protected Pressure Transducers Employing Two Electrically Interconnected Transducer Arrays" by A. D. Kurtz, et al., issued on Sep. 22, 1987 and assigned to the assignee herein, Kulite Semiconductor Products Inc., evidences the need for such pressure transducers, especially for use in external environments, which impose difficult operating conditions for transducer structures. The entire disclosure of U.S. Pat. No. 4,695,817 is hereby incorporated by reference herein.

For example, differential pressure transducers have uses in aircraft, automobiles and other vehicles. In such implementations, the transducer is typically exposed to moisture, fuel, solvents, hydraulic fluids and the elements in general. These transducers are often associated with pressure ports, as well as with internal cavities. During operation, the cavities, as well as the ports, may accumulate excessive amounts of water. Water can harm silicon and metal elements employed in conventional transducers. Metal diaphragms which are conventionally employed either as isolation diaphragms or with strain gauges mounted on an interior surface provide the required media isolation. Such an approach is satisfactory for absolute or sealed gate transducers, however, for gauge or differential transducers, severe problems arise.

The '817 patent describes devices utilizing oil filled sensing cavities for performing differential measurements. These devices rely on the use of PN junction based sensing elements, with cup shaped deflecting membranes. Such a device can be seen, for example, in FIG. 6 of the '817 patent. Basically, a metal diaphragm is used on a front side, behind which a piezoresistive pressure sensor is located within a hollow region filled with oil. The oil acts as an incompressible fluid transmitting the stress applied to the metallized isolation diaphragm to the sensing element. One transducer structure contains a half bridge intended to measure pressure applied to a positive port, while the second transducer structure is comprised of the half bridge intended to measure the negative pressure applied to the negative port. A full bridge is realized by electrically combining the half bridges from the positive and negative ports. Such a device has inherent limitations though.

For example, such a device may be limited to use in relatively low temperatures, such as temperatures below 175° C., due to the inherent temperature limitations of the PN junction. Also, there is no provision for preventing excessive deflection of the sensing membrane, in the event of an overpressure, which could lead to failures in actual use. Even under normal operating conditions, the performance of the PN junction based sensing element is limited due to thermal errors associated with the changes in zero offset and in sensitivity as a function of temperature.

Hence there is a need for an improved pressure transducer which does not utilize PN junction based devices, and which is capable of operating at high temperatures and high pressures. It is a further desire to produce such a transducer which is capable of withstanding high overpressures while maintaining extremely high resolution capability.

SUMMARY OF THE INVENTION

A semiconductor chip for use in fabricating pressure transducers, including: a semiconductor wafer having a top and a bottom surface, a layer of an insulating material formed on the top surface, the bottom surface having at least two recesses of substantially equal dimensions and spaced apart, the recesses providing first and second substantially equal thin active areas, which areas deflect upon application of a force applied to the top surface, a first plurality of piezoresistive devices arranged in a given pattern and positioned on the insulating material and located within the first area, a second equal plurality of piezoresistive devices arranged in the identical pattern and located on the insulating material within the second active area, first connecting means for connecting the first plurality of piezoresistive devices in a first array, second connecting means for connecting the second plurality of piezoresistive devices in a second array corresponding to the first array.

BRIEF DESCRIPTION OF THE FIGURES

Understanding of the present invention will be facilitated by considering the following detailed description of the preferred embodiments of the present invention taken in conjunction with the accompanying drawings, in which like numerals refer to like parts, and.

DETAILED DESCRIPTION OF THE INVENTION

It is to be understood that the figures and descriptions of the present invention have been simplified to illustrate elements that are relevant for a clear understanding of the present invention, while eliminating, for the purpose of clarity, many other elements found in typical flow and pressure sensing systems and methods of making and using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Figure 1:
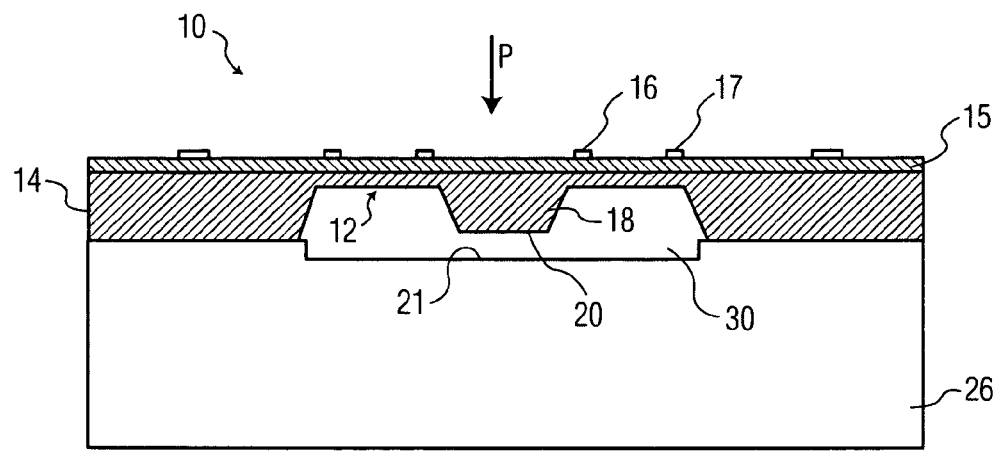
FIG. 1 is a cross sectional view of a silicon on insulator (SOI) transducer assembly according to an aspect of the present invention.

Referring to FIG. 1, there is shown a cross-sectional view of a transducer unit, or sensor, 10 employed according to an aspect of the present invention. The sensor 10 shown in FIG. 1 basically takes the form of a silicon-on-insulator (SOI) device.

Such a SOI structure may be fabricated using the methodology described in commonly assigned U.S. Pat. No. 5,286,671, entitled "Fusion Bonding Technique for Use in Fabricating Semiconductor Devices", issued on Feb. 15, 1994, to A. D. Kurtz et al. The '671 patent shows a method of bonding a first silicon wafer to a second silicon wafer. The disclosed method includes: diffusing a high conductivity pattern into a surface of a first semiconductor wafer, etching a portion of the surface to raise at least a portion of the pattern, providing a second semiconductor wafer having an insulating layer of a silicon compound disposed thereon, contacting the surface of the pattern to the insulating layer, and bonding the first and second semiconductor wafers at an elevated temperature. The entire disclosure of U.S. Pat. No. 5,286,671 is hereby incorporated by reference herein.

Commonly assigned U.S. Pat. No. 6,330,829, entitled "Oil Filled Pressure Transducers", issued on Dec. 18, 2001 to A. D. Kurtz et al. and assigned to the assignee hereof, shows, in FIG. 1 thereof, a top view of a transducer which can be employed according to an aspect of the present invention. The entire disclosure of U.S. Pat. No. 6,330,829 is also hereby incorporated by reference herein. The transducer of present FIG. 1 may be fabricated using the methodology described in U.S. Pat. No. 6,330,829. In the present invention, sensor devices 16 and 17 are electrically insulated from semiconductor substrate 14 by an oxide layer, such as a layer of silicon dioxide 15. For purposes of completeness, it may be noted that a pedestal, or wafer, 26 of present FIG. 1, has no aperture that corresponds to the aperture in the glass wafer 15 of the '829 patent. In any event the '829 patent shows a "leadless" transducer which can be employed with this invention.

Referring again to FIG. 1, device 10 generally includes a pressure responsive diaphragm 12 and a support 26. The diaphragm generally includes a semiconductor substrate 14 having thinned portion(s) 12. The semiconductor substrate 14 has disposed on a surface thereof an oxide layer 15, such as a layer of silicon dioxide 15. Upon the layer of silicon dioxide 15 are fabricated P++ sensing piezoresistors (e.g. 16 and 17). Piezoresistors 16, 17 are electrically insulated from the wafer 14 by the layer of silicon dioxide 15.

Semiconductor substrate 14 also includes a boss 18, which is located and fabricated in a central region of the semiconductor substrate 14 using conventional techniques. Boss 18 operates to stop the thinned, deflecting portions 12 of the diaphragm upon application of pressures P in excess of a desired amount or predetermined threshold. Referring still to FIG. 1, a stop is formed between a surface 20 of boss 18 and surface 21 of glass pedestal or wafer 26 serving as the support. In one embodiment, the stop is manifested by a step or indentation 30 impressed in the surface of glass wafer 26 facing boss 18. The recess 30 can be etched or otherwise formed in the glass pedestal 26, and the glass pedestal 26 electrostatically bonded to the silicon or semiconductor wafer 14 using conventional methodologies.

Upon a pressure P exerted to the diaphragm in excess of the predetermined threshold, the surface 20 of boss 18 will contact surface 21 of the glass pedestal 26, thereby preventing the diaphragm 12 from deflecting any further. This in essence formulates a mechanical stop which prevents rupture of the diaphragm based on excessive forces.

Because the sensor 10 has a stop boss 18 the thinned diaphragm portion 12 of the sensor is capable of withstanding extremely high overpressures while maintaining high resolution capability. This high resolution capability manifests itself in the transducer's ability to measure very small pressure differences. The sensing membrane (e.g., thinned portion 12) deflects as a function of pressure P until it bottoms out on the underlying mechanical stop established via cavity 30 in the underlying support 26. The distance between the boss 20 and stop 21 indicates how much pressure sensor 10 will tolerate, e.g., how much pressure can be applied before it bottoms out. Once the deflecting membrane reaches the stop it can handle additional overpressure without damaging the sensor network. The stop capability allows one to make very sensitive, or thin, diaphragms that can handle extreme overpressures. Another advantage associated with using the SOI sensing elements is that it enables the transducer to operate at significantly high temperatures not limited by the inherent limitations of PN junction isolation.

As one can thus ascertain, the sensor 10 is a silicon on insulator (SOI) structure that is capable of extremely high temperature and high pressure operation, with high resolution.

According to an aspect of the present invention, such a structure may be used to realize differential transducers capable of high temperature operation, even with truly media isolated oil filled configurations by using higher temperature silicon oils. Again, the use of an oil filled diaphragm is known and for example is shown in the above noted U.S. Pat. No. 4,695,817 as well as other patents. The sensor may be filled with oil, such as a silicon oil. In this manner, utilizing the sensor device shown and depicted in FIG. 1, one can utilize higher temperature oils to obtain extremely high temperature operation.

As one can ascertain, the above noted U.S. Pat. No. 6,330,829 enables one to utilize leadless type SOI sensors. Such leadless sensors enable a reduction of the volume of oil, based on a substantial reduction in the cavity size between the isolation diaphragm and the sensing element. The reduction in the cavity size comes as a result of the elimination of typical wire bonds, which enables one to move the isolation diaphragm closer to the sensing chip, as the leadless sensor takes up most of the volume in the oil cavity.

According to an aspect of the present invention, the thermal error of the transducer that was typically associated with oil expansion as a function of temperature in the '817 patent may be substantially eliminated, as both positive and negative pressure ports may exhibit substantially the same (i.e. equal) thermal effects due to the expansion of oil. Therefore, by subtracting. one bridge response from the other through forming a full bridge, the effects of oil expansion are virtually eliminated.

In a PN junction isolated transducer, there are random and considerable variations with temperature because of different characteristics of each PN junction. Using SOI chips as shown in FIG. 1, there is no PN junction and therefore no PN junction leakage with temperature, this is an unanticipated advantage obtained by using SOI chips.

Further, by using very degenerate P++ doping, experienced zero shifts by themselves are much lower. In addition, because of the degenerative P++ doping utilized in the elements, the inherent output and the temperature coefficient of gauge factor (TCGF) is more uniform from sensor to sensor, thus making it easier to match sensors before the assembly into the respective pressure ports of the transducer. This leads to further reduction of thermal errors.

Figure 2:
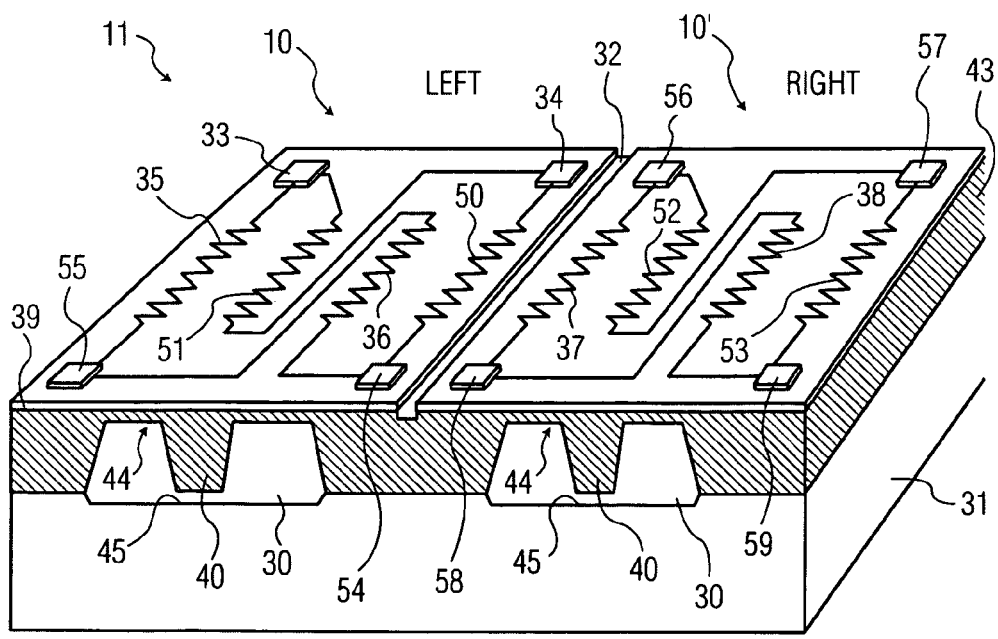
FIG. 2 is a perspective view of the transducer assembly including two transducer units (sensors), side-by-side, on a single substrate according to an aspect of the present invention.

Another unanticipated advantage is introduced with a capability of making a redundant SOI differential transducer incorporating dual SOI sensors on a same chip, electrically isolated from each other. Referring now also to FIG. 2, there is shown a perspective view of a transducer chip 11 according to an aspect of the present invention. Essentially, the transducer chip 11 contains two individual sensors 10, 10' disposed on a single chip, where each sensor 10, 10' has an analogous configuration to that presented in FIG. 1.

The chip of FIG. 2 includes a glass substrate 31, affixed to a semiconductor substrate 43, using electrostatic bonding for example. Semiconductor substrate 43 has a top surface coated with oxide 39, in turn having P++ piezoresistors 35, 36, 37, 38, 50, 51, 52, 53 formed thereon. P++ contacts 33, 34, 54, 55, 56, 57, 58, 59 are also provided over oxide 39. As seen, each of the sensors has its own boss 40 and recess 30 in the glass support 31 forming stop surfaces 45, respectively. Around each boss 40 are thinned deflecting regions 44 of the diaphragm.

Alternatively, each sensor may be akin to that described in U.S. Pat. No. 5,955,771 entitled "Sensors for Use in High Vibrational Applications and Methods for Fabricating the Same" issued on Sep. 21, 1999 or commonly assigned U.S. Pat. No. 5,973,590 entitled "Ultra-thin Surface Mount Wafer Sensor Structures and Methods for Fabricating the Same", issued on Oct. 26, 1999. The entire disclosures of each of these patents are also incorporated herein as being set forth in their entireties.

The sensors are separated by an isolation groove 32. Isolation groove 32 can be formed by etching or other techniques. The isolation groove operates to electrically isolate the left sensor structure 10 (LEFT) from the right sensor structure 10' (RIGHT). The groove goes through the oxide layer 34 into the surface of the substrate 43. The piezoresistors (e.g., 35, 36 and 37, 38) are extremely well matched to each other in terms of their performance characteristics, because they are adjacent to each other, their thicknesses and P++ concentration are essentially the same and they are fabricated at the same time by the same processes. Thus, the outputs and the thermal characteristics of all the piezoresistors (e.g. 35, 36, 37, 38) will be very well matched, and even essentially be the same. This enables better overall matching using two redundant half-bridge circuits attached to one pressure point, as compared to two independently formed sensors.

In the preferred form shown in FIG. 2, the piezoresistors of sensors 10, 10' each are four in number and series coupled. For example, one terminal of piezoresistor 50 is coupled to contact 34 as is one terminal of piezoresistor 51. The other terminal of piezoresistor 50 is coupled to a contact 54, as is one terminal of piezoresistor 36. The other terminal of piezoresistor 36 is coupled to contact 55. Also coupled to contact 55 is one terminal of piezoresistor 35, which has the other terminal connected to contact 33, which also accommodates the connection of one terminal of piezoresistor 51. In a similar manner the sensors 37, 52, 38 and 53 are all series connected in the above noted manner to terminals 56, 57, 58 and 59.

Figure 3:
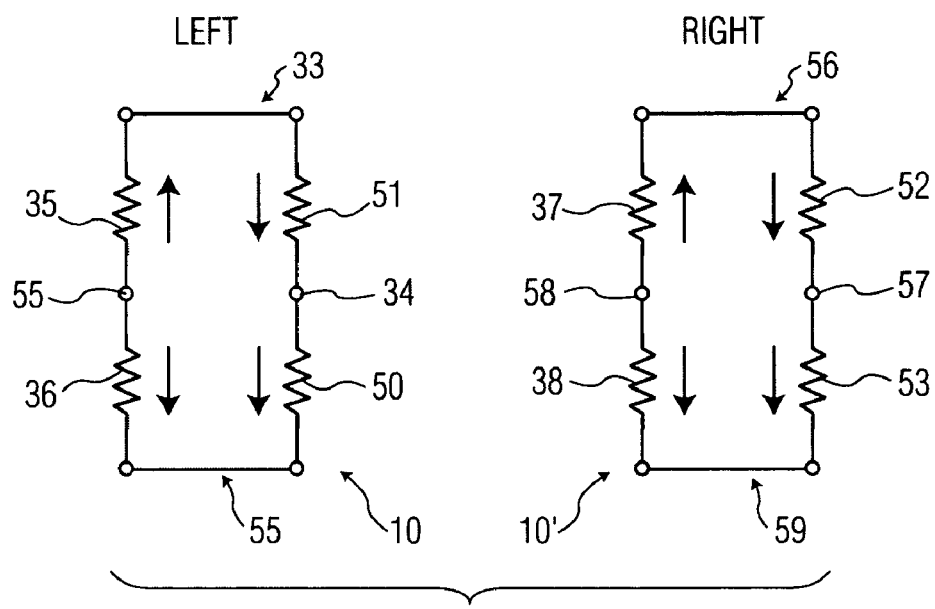
FIGS. 3-7 depict circuit diagrams capable of being implemented by the configuration depicted in FIG. 2, according to aspects of the present invention; and, FIG. 8 depicts a circuit configuration which can be implemented utilizing the resistor configuration shown in FIG. 7.

According to an aspect of the present invention, certain of these connections can be selectively provided or removed to form a number of different bridge configurations. For the sake of explanation, FIG. 3 depicts a circuit representation of FIG. 2. FIG. 3 illustrates both sensors 10, 10', with each of the piezoresistors designated by the same reference numerals as in FIG. 2. Again, piezoresistor 50, for example, is connected to terminal 34 at one end, and terminal 54 at the other end, and piezoresistor 36 is connected to terminal 54 at one end and terminal 55 at the other. As one can ascertain the configurations 10 and 10' of FIG. 3 are full Wheatstone bridge configurations. The structures in FIG. 3 can be used to implement redundant absolute devices.

Certain of the connections can be broken, or not provided, and therefore one by adding additional uncouple contacts (A & B) can provide different circuit structures utilizing the configuration shown in FIG. 3. In any manner, it should be understood that the illustrated circuit configurations can be implemented by either breaking a connection using laser burning or any other technique, or by not making the connection, in accordance with the particular transducer structure that one desires or by introducing additional contact regions into the device patterns. This can be implemented by the photomasks used in forming the piezoresistors.

The connections can be selectively opened using a laser or other technique, whereby a connection to a select one of the piezoresistors can be burned out or otherwise disposed of. Alternatively, the connection does not have implemented in the first place. For example, and referring still to FIG. 3, piezoresistors 50 and 51 do not have to be connected together, piezoresistors 51 and 33 do not have to be connected together, and so on.

Referring still to FIG. 3, where leads are broken, each of the circuit configurations corresponding to sensor 10 and sensor 10' will have four piezoresistors that can be selectively coupled. Different circuit configurations may be employed. Referring again to U.S. Pat. No. 4,695,817, and more particularly to FIG. 4 thereof, there is shown a housing having a positive input pressure port designated by reference numeral 32 and a negative input pressure port designated by numeral 38 or vice versa. Each pressure port 32, 38 thereof is associated with a transducer structure. According to an aspect of the present invention, the herein-described device 11 (as depicted in FIG. 2 hereof, for example) may be used with the housing of the '817 patent, such that each of the ports 32, 38 thereof are associated with one of the sensors 10, 10'. Of course, other configurations may be used as well though.

In the '817 patent, a full bridge is formed by two resistors associated with the positive port and two resistors in the array associated with the other port which is the negative port.

Figure 4:
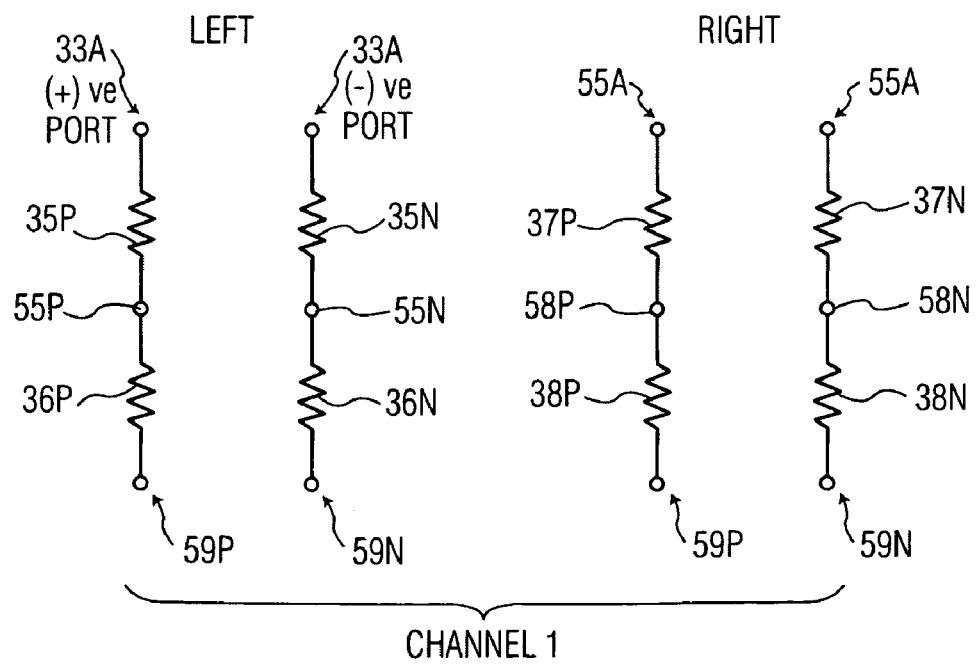

Referring now also to FIG. 4, the piezoresistors of FIG. 2 may be selectively coupled to obtain a new relationship of piezoresistors on a single chip 11. Two such chips can be employed with the pressure transducer configuration depicted in U.S. Pat. No. 4,695,817, with one chip as shown in FIG. 2 placed at the positive port and the other placed at the negative port. Each chip has the piezoresistor configurations depicted in FIG. 4, thus each chip has redundant half bridges as is shown in FIG. 4. As seen, a half bridge from each chip can be wired together to form a full bridge according to the teachings of the '817 patent to obtain a sensor output, or each half bridge from each chip can be wired together to obtain a redundant pressure output which can be checked one against the other. The circuits shown in FIG. 4 can be used to provide a differential device.

By selecting a half bridge from each of the two transducers placed at each of the different ports, and connecting these half bridges together to form a full bridge, the composite transducer provides an output which is indicative of the pressure applied to the positive port as modified or corrected by the pressure applied to the negative port. Alternatively, the two pressures may be fed to the two sensor's 10, 10' on a common chip, respectively.

As indicated, FIG. 3 shows a full Wheatstone bridge connection for sensor 10. FIG. 3 shows a full Wheatstone bridge connection for sensor 10'. As seen, the piezoresistors are configured in a full Wheatstone bridge with terminals 34, 55 and 57, 58 being the terminals to which a biasing voltage would be applied and with terminals 33, 54 and 56, 59 being the output. This corresponds to the circuit shown in FIG. 2, and provides two full Wheatstone bridge configurations with the arrows depicted in FIG. 3 showing which piezoresistors of the bridge are in tension and which are in compression. Thus, utilizing the full Wheatstone bridge configurations as depicted in FIGS. 2 and 3, and having one chip 10 at the first pressure port or the positive pressure port and having another chip 10 at a negative pressure port, one can obtain redundant differential measurements from the transducer configuration shown. These redundant readings may be compared to indicate possible faulty operation, or circuit failure. Alternatively one may in certain instances, use a tube to transmit a pressure to either the left or right sensor.

Alternatively, a single chip may be used, with one sensor communicating with the positive port and the other communicating with the negative port. In such a case, the sensors 10, 10' of a common chip 11 may be arranged according to the configurations of the '817 patent's separate transducers.

Alternatively, one can utilize a full Wheatstone bridge from each transducer to obtain redundant outputs, or in a similar manner utilize full Wheatstone bridges from both units therefore having two full Wheatstone bridges on each transducer to form redundant outputs for each chip 10. This is extremely advantageous in the event one circuit fails, as an output would still be provided by the other circuit. Optionally, the outputs may be automatically compared to determine whether a difference there-between exceeds a threshold value. In the event it does, the transducer may be characterized as being faulty. This may be accomplished by automatically comparing the outputs, and triggering an indicator if the difference exceeds the threshold. This may be accomplished digitally using a processor and memory, for example, or by electrically comparing the outputs and providing a signal indicative of the difference. In this way a confirmed pressure measurement may be obtained.

Figure 5:
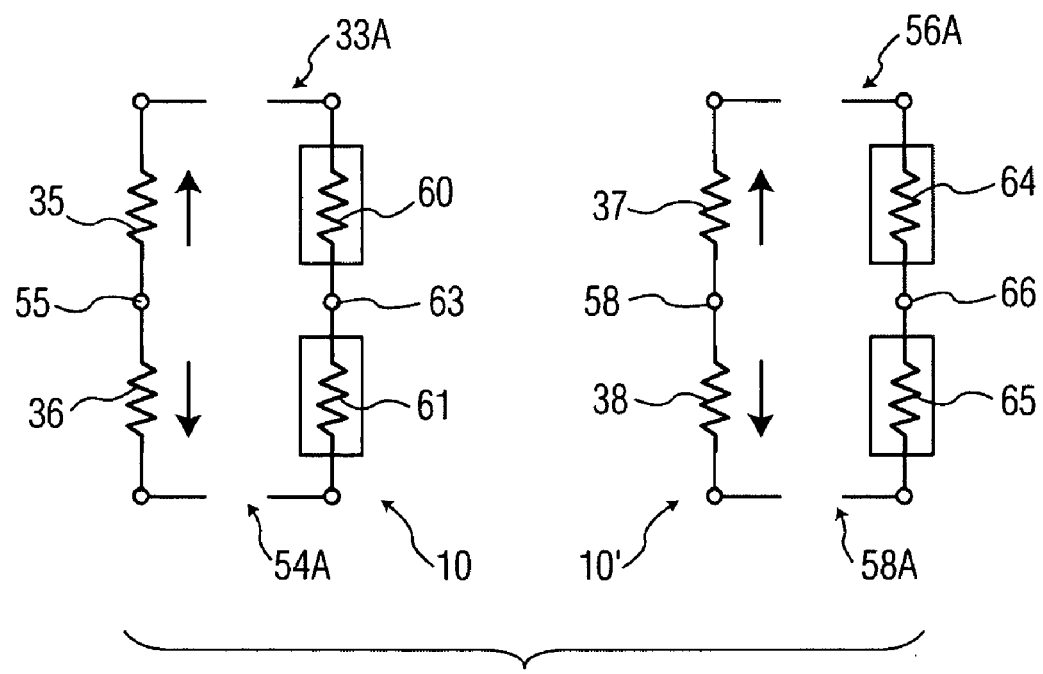

Referring now also to FIG. 5, there is shown still another configuration which can be utilized for redundant absolute pressure measurement. Therein, fixed resistors 60 and 61 shunt the piezoresistors 35 and 36, while fixed resistors 64 and 65 shunt the piezoresistors 37 and 38. The fixed resistors may be fabricated on one or more non-active regions of the oxide layer 39 (e.g., other than on thinned regions 44) (FIG. 2) or located externally. It should be understood that, in a similar manner, piezoresistors 51 and 50 as well as piezoresistors 52 and 53 can also be shunted by fixed resistors.

Figure 6:
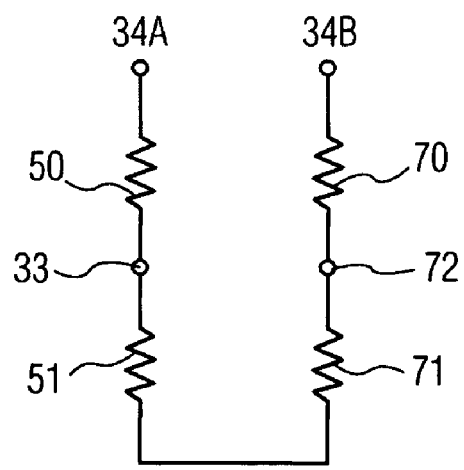

Referring now also to FIG. 6, there is shown another possible circuit implementation for absolute pressure measurement as seen by one port. For example, the device of FIG. 2 may be configured as is shown in FIG. 4 and placed at one port of the pressure transducer, while another device of FIG. 2 may be configured as is shown in FIG. 6 and placed at the other port. FIG. 6 also shows representative piezoresistors being shunted by fixed resistors. Thus, in FIG. 6 there is shown the sensor 10 piezoresistors 51 and 50 being shunted by fixed resistors 70 and 71 having an output between them designated as 72, where the terminals 34a and 34b (which correspond to terminal 34 of FIG. 2) are left open to be connected in conjunction with the absolute pressure sensors at the other port which are aligned and configured as that shown in FIG. 4. Using this configuration, one can obtain differential and absolute redundant pressure measurements.

Such a configuration may be used for absolute pressure or differential (or both) measurement as described in detail in U.S. Pat. No. 4,695,817. To reiterate it is clear that an unanticipated advantage of the configurations depicted above as introduced with the capability of making a redundant SOI differential transducer by using specifically designed dual SOI sensors on the same chip which are electrically isolated from each other as depicted for example in FIGS. 1 and 2.

In any event, both sensors are extremely well matched to each other in terms of their performance characteristics because they are adjacent to each other so their thicknesses are essentially the same and so are their P++ concentrations. Thus both their outputs and their thermal characteristics will be essentially the same. This enables better overall matching of the two redundant half bridge circuits, whether attached to one pressure port or separate pressure ports.

Another unanticipated advantage using the above techniques results when one half bridge from each of the diaphragms can be connected to an appropriate half bridge on the other pressure sensing port giving a redundant transducer with better thermal operational linearity. The unused half bridge from each of the deflecting diaphragms can be connected to external resistors making possible the measurement of redundant absolute pressure measurements from each of the two pressure ports. Comparisons between the outputs may be made to confirm proper device operation.

Thus, the configuration shown for example in FIG. 4 can be employed to form sensors as they appear in positive and negative ports with each chip containing two separate half bridges. The remaining figures depict interconnecting schemes of reducing the differential output while others depict interconnecting schemes for producing absolute pressure measurements as seen by each of the two pressure ports.

In addition, another unanticipated advantage makes possible measurement of differential pressure for each of the measured pressures extremely high, and for example above 1000 PSI. The devices may take the form of SOI structures.

For example reference is made to U.S. Pat. No. 5,614,678 entitled "High Pressure Piezoresistive Transducers", the entire disclosure of which is hereby incorporated by reference herein. Such transducers can be implemented in the assembly of a differential transducer thus enabling high accuracy and high stability measurements even in extreme pressure and differential pressure environments. It is thus ascertained from the above that the sensor configuration depicted in FIG. 2, which is essentially comprised of eight piezoresistors with four piezoresistors on the left and four resistors on the right, can be implemented in many, many useful arrangements.

Figure 7:
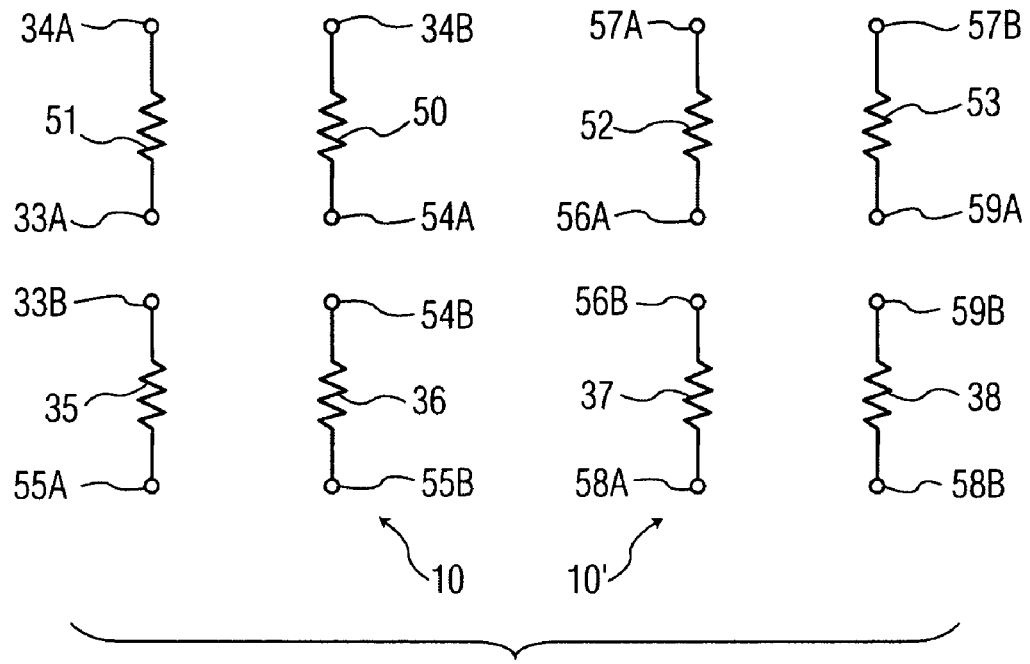
Figure 8:
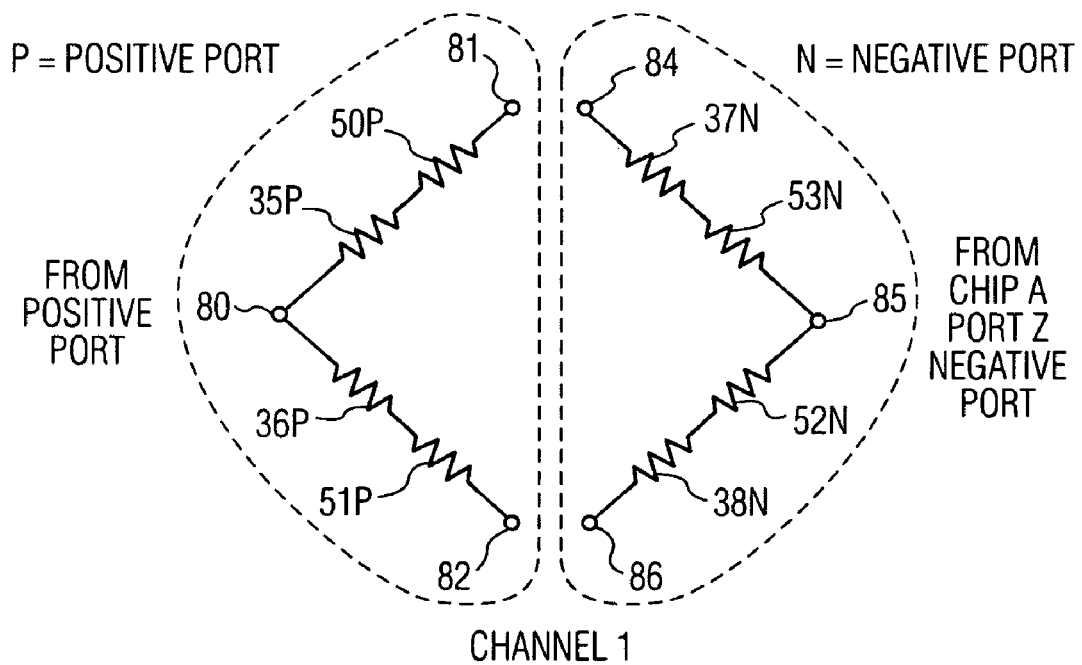

Now turning to FIG. 7, it is shown that each of the resistors are separated and as indicated above each has its own terminals. FIG. 8 depicts a configuration whereby the individual piezoresistors can be utilized for redundant differential measurements. As seen in FIG. 8, the piezoresistors 35P and 50P are connected in series between terminals 80 and 81. In a similar manner, piezoresistors 36P and 51P are connected in a series between terminals 80 and 82. Piezoresistors 37N and 53N are connected in series between terminal 84 and terminal 85. While piezoresistors 52N and 38N are connected in series between terminals 85 and 86.

In this manner, two chips having those resistors may be provided, and by wiring as depicted in the '678 patent, one may obtain differential measurements with the piezoresistors being connected in series to produce absolute temperature cancellation and zero characteristic cancellation because of the nature of the piezoresistors as connected in the series. This connection will essentially cancel out thermal differences as well as differences in zero offset and so on by connecting the resistors as shown. Most important is the fact that one can obtain high resistances which are typically required for many sensor applications, without implementing any changes in the design and therefore not sacrificing any performance characteristics.

It is of course understood that there would be two such chips to provide the configurations depicted thus it is seen that the chip depicted in FIG. 2 has numerous applicability in regard to the provision of differential and absolute transducers and eliminates all the problems inherent with metal diaphragms and PN junctions as described above.

Figure 9:
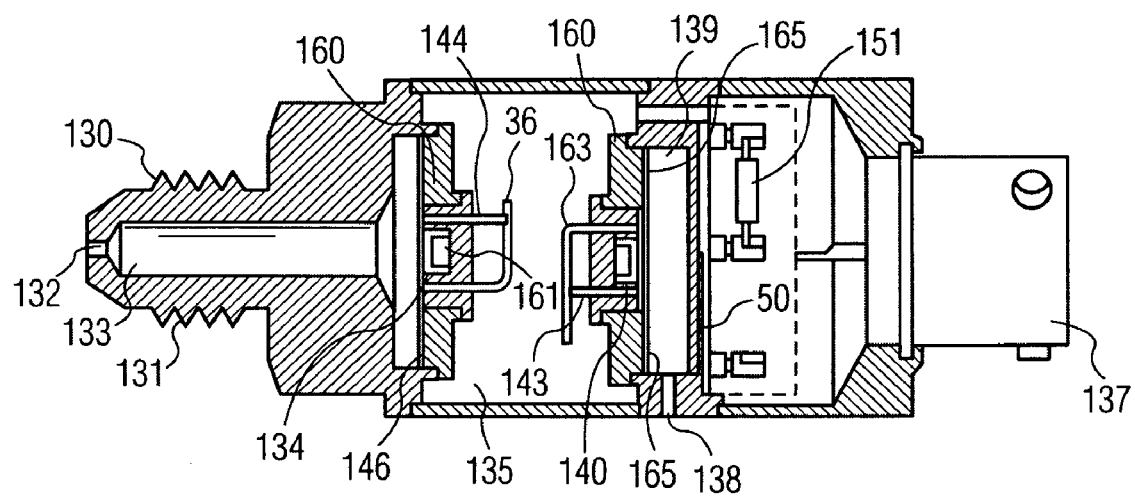
FIG. 9 is a cross-sectional view of a differential transducer and a housing for the same.

Referring to FIG. 9 there is shown a mechanical assembly depicting a housing for two separate transducer assemblies as show for example in FIGS. 1 and 2. There is shown a housing having a front section 130 of a reduced diameter. The front section 130 has a threaded portion 131 to enable it to be threaded with a suitable aperture so that the input pressure port 132 can interface with a source of pressure to be monitored such as oil pressure in an engine and so on. The input pressure port 132 is the positive port. The housing has an elongated aperture 133 which communicates with port 132 at one end and interfaces with a pressure transducer structure 134 located in a separate cavity within the hollow interior 135 of the transducer assembly.

The other end of the elongated aperture 133 communicates directly with an isolation diaphragm 146. The isolation diaphragm is fabricated to be rather flexible and is typically made from stainless steel and is welded around the peripheral edge of the housing as shown in FIG. 4. In general overlapping spot welding may be employed. The pressure transducer structure 134 is a full pressure transducer with a mounting material such as epoxy or Viton rubber to the top surface of a header 161. The structure of the pressure transducer is depicted above.

As indicated, the pressure transducer structure 134 is a device with a full or half bridge array deposited thereon as for example bridge circuits of FIG. 3 or a full bridge array. Suitable leads from the transducer structure 134 are coupled to pins 144 and are used to effect electrical connections to the array at the negative port, and eventually are directed to the end connector 137.

There is also shown a tube 136. This tube is brazed or glass-to-metal sealed to the header 166 and enables one to fill the internal cavity 160 associated with the transducer with silicon oil or some other pressure transmitting fluid. After filling the cavity 160 with oil, the tube 136 is sealed off, by soldering, welding or other means, and thus the entire transducer structure 134 is surrounded by a pressure transmitting fluid. The oil filled cavity 160 has one end terminated in the isolation diaphragm 146 and the other end closed by the transistor header structure 161.

The negative pressure port 138 is shown and consists of a vent aperture which is located in the side of the transducer structure and essentially communicates with a source of reference pressure such as atmospheric pressure. If the transducer is to be differential rather than gage, a second port similar to the positive port 132 may be secured at the point where the aperture is placed.

The aperture 138 communicates with an internal hollow 139 which interfaces via a second metal isolation diaphragm 165 with a second transducer structure 140. The transducer structure 140 is very similar to the transducer structure 134 which is placed at the positive port.

The transducer structure 140 is also associated with a tube 163 to allow the internal cavity associated with the transducer structure to be filled with oil as for transducer 134. The internal hollow 139 communicates with the transducer structure by means of a stainless steel diaphragm 165 which is also welded by means of a capacitive discharge or other techniques to a housing section associated with the transducer structure. Thus as can be seen from FIG. 9, each pressure transducer assembly is associated with a stainless steel diaphragm as 146 and 165 which diaphragm is welded or otherwise rigidly secured to the housing. In both cases pressure is communicated to the sensor by means of oil or other fluids.

A complete pressure sensor which may be silicon device secured to an associated housing is shown. Each transducer structure is associated with a base plate which forms together with the steel diaphragm an internal hollow or cavity which can be then filled with oil to provide a pressure transmitting environment. Thus as is apparent from the structure of FIG. 4, the sensors as contained in the respective cavities are only exposed to the oil which is a noncontaminating fluid and the presence of the steel diaphragm prevents the oil from leaking out of the transducer or otherwise affecting the external environment as directed via the pressure ports 132 and 138.

Furthermore, the device is such that any water or external fluid which may enter the respective pressure ports or the internal hollow of the transducer are in contact only with the housing structure and the metal isolation diaphragm and, therefore, cannot damage the transducer structures 134 and 140. Thus even if water enters the cavities as 139 and the elongated aperture as 133, it will not permanently damage or contaminate or otherwise affect the transducer operation. All components of the transducer shown are welded and moisture cannot penetrate any port of the structure other than the media compatible areas. This structure is mechanically unique and solves a long standing problem in the use of silicon diaphragms in differential pressure measurement applications.

As can be seen from FIG. 4, each transducer structure as 134 to 140 contains the necessary piezoresistive array where the piezoresistors are further protected from the pressure transmitting environment as located on the opposite of the diaphragms. All connections between the structures 134 and 140 are implemented via the terminal pins as 143 and 144 emanating from the transducer structure or can be implemented at the connector 137 as is well known. All electrical connections are retained within hermetically sealed portions of the transducer housing.

In summary, the present invention depicts differential pressure transducers which employ silicon on insulator (SOI) chips. Each chip includes a first and second array of piezoresistors which are dielectrically isolated from a silicon substrate the resistors formed on each of the chips can be wired in numerous configurations to provide differential and absolute pressure measurements. As indicated each chip has a left and a right portion where each portion contains four piezoresistors which each piezoresistor dielectrically isolated from the substrate. The chip has a stop member associated with each of the piezoresistive arrays to enable the chip to respond to high pressures which when the pressure is exceeded the stop will handle any overpressure without damaging the sensing network. Because of the use of the chip configuration, the entire unit can be used to obtain differential transducers capable of high temperature operability in the presence of, for example isolated oil filled configurations to enable the use of higher temperature silicon oils. The chip is used in transducer housings which have a positive port and a negative port and in this manner one transducer structure can be utilized as a half bridge intended to measure the main pressure applied to the positive port while the second transducer structure contains a half bridge intended to measure the negative pressure applied to the negative port. The whole bridge can be implemented by combining the half bridges from the positive and negative port transducers. In any event other configurations can be implemented. It is also understood that while the techniques and structures can be used for oil filled transducers, they can also apply to other transducers not using oil or metal diaphragms. It should become obvious to one skilled in the art that many alternative embodiments will be available and will be discerned all these embodiments are deemed to be encompassed within the spirit and scope of the claims appended hereto.

What is claimed is:

1. A semiconductor chip for use in fabricating pressure transducers, comprising:
    a semiconductor wafer having a top and a bottom surface, a layer of an insulating material formed on said top surface, said bottom surface having at least two recesses of equal dimensions and spaced apart, said recesses providing a first and second equal thin active areas, which areas deflect upon application to a force applied to said top surface;
    a first plurality of piezoresistive devices arranged in a given pattern and positioned on said insulating material and located within said first active area;
    a second equal plurality of piezoresistive devices arranged in the identical pattern and located on said insulating material within said second active area;
    first connecting means for connecting said first plurality of piezoresistive devices in a first array;
    second connecting means for connecting said second plurality of piezoresistive devices in a second array corresponding to said first array;
    a glass pedestal bonded to the bottom surface of said semiconductor wafer to provide a support for said semiconductor wafer;
    a first recess on the top surface of said glass pedestal and positioned about said first active area, and a second recess on the top surface of said glass pedestal and positioned about said second active area; and
    a first boss extending from said bottom surface of said wafer and symmetrically positioned with said first active area and operative to impinge upon said glass pedestal surface within said first recess when a force in excess of a predetermined force is applied to said top surface, and a second boss symmetrical to said first boss and also extending from said bottom surface of the wafer and also symmetrically positioned as said first boss within said second active area and operative as said first boss.

2. A pressure transducer, comprising:
    a first semiconductor wafer having a top and a bottom surface, a layer of insulating material formed on said top surface, said bottom surface having at least two recesses of substantially equal dimensions and spaced apart, said recesses providing first and second substantially equal thin active areas, which areas deflect upon an application of a force applied to said top surface,
    a first plurality of piezoresistors arranged in a given pattern and positioned on said insulating material and located within said first active area,
    a second plurality of piezoresistors arranged in the identical pattern and located on said insulating material and within said second active area, said first semiconductor wafer adapted to receive pressure from a first pressure port,
    a second semiconductor wafer configured exactly as said first wafer, with said second semiconductor wafer adapted to receive a pressure from a second pressure port, and
    means connecting piezoresistorsfrom said first wafer to piezoresistors from said second wafer to form a bridge from said piezoresistors and operative to provide an output indicative of the pressure applied to said first port as modified by the pressure applied to said second port.

3. The pressure transducer according to claim 2 wherein said means connecting said piezoresistors provide a differential output wherein said output is the difference between the pressure applied to said first and second ports.

4. The pressure transducer according to claim 3 wherein said means connecting said piezoresistors provide an absolute output.

5. The pressure transducer according to claim 2 wherein said first and second semiconductor wafers are silicon, with said insulating layers being silicon dioxide proving first and second silicon on oxide structures (SOI).

6. The pressure transducer according to claim 5 wherein said SOI structures are lead less SOI structures.

7. The pressure transducer according to claim 6 further including a first glass pedestal bonded to the bottom surface of said fist wafer to provide a support, and a second relatively identical glass wafer bonded to the bottom surface of said first wafer to provide a support.

8. A pressure transducer, comprising:
    a housing having first and second inlet ports for receiving first and second pressures,
    a first transducer assembly including a first semiconductor wafer having a top and a bottom surface, a layer of an insulating material formed on said top surface, said bottom surface having a recess to provide a thin active area, which area deflects upon application of a force applied to said top surface with said top surface communicating with said first inlet port,
    a first plurality of piezoresistive devices arranged in a given pattern and positioned on said insulating material and located with said active area,
    a second pressure transducer assembly including a second semiconductor wafer having a top and bottom surface, a layer of insulating material found on said top surface, said bottom surface having a recess to provide a thin active area dimensioned to correspond to said thin active area of said first wafer,
    a second plurality of piezoresistive devices arranged in an identical pattern and positioned on said insulating material and located with said active area,
    which area deflects upon application of a force applied to said top surface of said second wafer, with said top surface of said second wafer communicating with said second inlet port, and
    means coupling respective piezoresistive devices of said first wafer to respective piezoresistive devices of said second wafer to form a piezoresistive array where the output voltage of said array is indicative of the pressure applied to said first inlet port as referenced to said other inlet port.

9. The pressure transducer according to claim 8 wherein said first and second wafers are silicon and said insulating layers are silicon dioxide.

10. The pressure transducer according to claim 9 wherein said voltage output of said array in a differential output.

11. The pressure transducer according to claim 9 wherein said voltage output of said array in an absolute output.

12. The pressure transducer according to claim 9 wherein said silicon wafers are leadless silicon on Insulator (SOI) devices.

* * * * *